US008345028B2

(12) United States Patent
Huang et al.

(10) Patent No.: US 8,345,028 B2
(45) Date of Patent: Jan. 1, 2013

(54) DRIVING CIRCUIT, ELECTRONIC DISPLAY DEVICE APPLYING THE SAME AND DRIVING METHOD THEREOF

(75) Inventors: Chih-Chuan Huang, Kaohsiung (TW); Yu-Lung Lo, Taipei (TW); Hsin-Yeh Wu, Kaohsiung (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 348 days.

(21) Appl. No.: 12/851,277

(22) Filed: Aug. 5, 2010

(65) Prior Publication Data

US 2011/0069045 A1 Mar. 24, 2011

(30) Foreign Application Priority Data

Sep. 23, 2009 (TW) .................................. 98132110

(51) Int. Cl.
*G06F 3/038* (2006.01)

(52) U.S. Cl. ............. 345/204; 345/64; 345/65; 345/66; 345/67; 345/68; 377/69; 377/70; 377/71; 377/72; 377/73

(58) Field of Classification Search .................. 345/204, 345/208, 209, 87, 96
See application file for complete search history.

*Primary Examiner* — Kent Chang
*Assistant Examiner* — Isaak R Jama

(57) ABSTRACT

A driving circuit applied in an electronic display apparatus is provided. The driving circuit includes a first exchange circuit and a first buffer. The first buffer includes first and second input stages, a second exchange circuit and first and second output stages. The first exchange circuit selectively couples a first input signal and a first output signal outputted from the first output stage to one of the first and the second input stages; and selectively couples a second input signal and a second output signal outputted from the second output stage to the other of the first and the second input stages. The second exchange circuit selectively couples the first input stage to one of the first and the second output stages and selectively couples the second input stage to the other of the first and the second output stages.

9 Claims, 2 Drawing Sheets

DRIVING CIRCUIT, ELECTRONIC DISPLAY DEVICE APPLYING THE SAME AND DRIVING METHOD THEREOF

This application claims the benefit of Taiwan application Serial No. 98132110, filed Sep. 23, 2009, the subject matter of which is incorporated herein by reference.

BACKGROUND OF THE DISCLOSURE

1. Field of the Invention

The disclosure relates in general to a driving circuit, an electronic display apparatus using the same and the driving method thereof.

2. Description of the Related Art

Having advantages such as low radiation and low power consumption, liquid crystal display (LCD) has gradually become the mainstream product of display. LCD normally includes several source driving circuits. The source driving circuit receives an analog driving voltage for driving the LCD panel. Conventionally, an independent gamma buffer generates the analog driving voltage to all source driving circuits. However, to reduce the cost, the gamma buffer is already integrated into the source driving circuit (that is, each source driving circuit has its respective gamma buffer). Since the respective gamma buffer of each source driving circuit has respective offset, the source driving circuits may have offsets from each other, and this may result in abnormal display.

To resolve the above offset problem, the voltage offset is averaged by a chopper stabilized offset cancellation method. In the prior chopper stabilized offset cancellation method, extra control signal is required for timing control. If the frequency of the control signal is too low and is close to the frequency band observable by human eyes, the problem of LCD flickering may occur.

Besides, during polarity inversion, the positive analog driving voltage and the negative analog driving voltage generated according to the prior art will not match with each other (this is because the threshold voltages of the buffers may not match with each other due to process factors), and this may even result in abnormal display.

SUMMARY OF THE DISCLOSURE

A driving circuit applied in an electronic display apparatus is provided in an exemplary embodiment of the disclosure. The driving circuit includes a first exchange circuit and a first buffer coupled to the first exchange circuit. The first buffer includes: a first input stage and a second input stage both coupled to the first exchange circuit; a second exchange circuit coupled to the first input stage and the second input stage; and a first output stage and a second output stage both coupled to the second exchange circuit. The first exchange circuit selectively couples a first input signal and a first output signal outputted from the first output stage to one of the first input stage and the second input stage; and selectively couples a second input signal and a second output signal outputted from the second output stage to the other of the first input stage and the second input stage. The second exchange circuit selectively couples the first input stage to one of the first output stage and the second output stage, and selectively couples the second input stage to the other of the first and the second output stage.

A driving circuit applied in an electronic display apparatus is provided in another exemplary embodiment of the disclosure. The driving circuit includes: a first exchange circuit; and a first buffer coupled to the first exchange circuit. The first buffer includes a first input stage coupled to the first exchange circuit; a second input stage coupled to the first exchange circuit; a second exchange circuit coupled to the first input stage and the second input stage; a first output stage coupled to the second exchange circuit; and a second output stage coupled to the second exchange circuit. The first exchange circuit selectively couples a first input signal and a first output signal outputted from the first output stage to one of the first input stage and the second input stage and selectively couples a second input signal and a second output signal outputted from the second output stage to the other of the first input stage and the second input stage. The second exchange circuit selectively couples the first input stage to one of the first output stage and the second output stage and selectively couples the second input stage to the other of the first output stage and the second output stage.

A driving method for an electronic display apparatus is provided in yet another exemplary embodiment of the disclosure. In a first operating mode, a first input signal and a first output signal are amplified by a first input stage. A second input signal and a second output signal are amplified by a second input stage. An output signal outputted from the first input stage is amplified by a first output stage to obtain the first output signal which is further fed back to the first input stage. An output signal outputted from the second input stage is amplified by a second output stage to obtain the second output signal which is further fed back to the second input stage. Digital-to-analog conversion is performed on an output signal outputted from the first output stage to obtain a first intermediate analog signal. Digital-to-analog conversion is performed on an output signal outputted from the second output stage to obtain a second intermediate analog signal. The first intermediate analog signal is amplified by a first buffer to obtain a first analog output signal. The second intermediate analog signal is amplified by a second buffer to obtain a second analog output signal. In a second operating mode, the first input signal and the first output signal are amplified by the second input stage. The second input signal and the second output signal are amplified by the first input stage. The signal outputted from the first input stage is amplified by the second output stage to obtain the second output signal which is further fed back to the first input stage. The signal outputted from the second input stage is amplified by the first output stage to obtain the first output signal which is further fed back to the second input stage. Digital-to-analog conversion is performed on the signal outputted from the first output stage to obtain the first intermediate analog signal. Digital-to-analog conversion is performed on the signal outputted from the second output stage to obtain the second intermediate analog signal. The second intermediate analog signal is amplified by the first buffer to obtain the first analog output signal. The first intermediate analog signal is amplified by the second buffer to obtain the second analog output signal. The electronic display apparatus is driven by the first and the second analog output signals.

The disclosure will become apparent from the following detailed description of the preferred but non-limiting embodiments. The following description is made with reference to the accompanying drawings.

DETAILED DESCRIPTION OF THE DISCLOSURE

Figure 1:
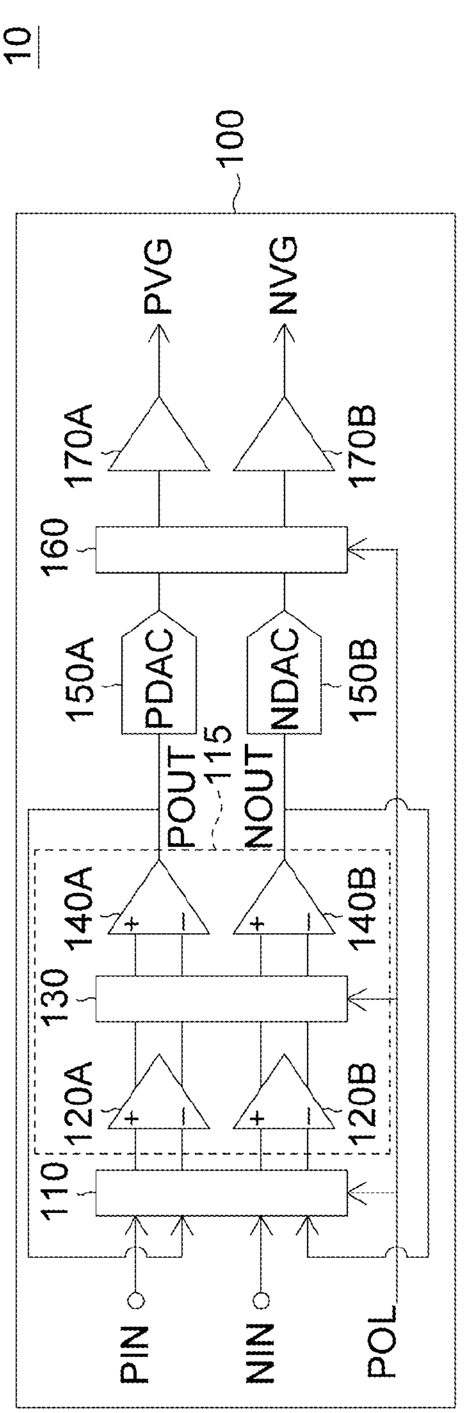
FIG. 1 shows a functional block diagram of a source driving circuit according to an embodiment of the disclosure.

FIG. 1 a functional block diagram of a source driving circuit 100 according to an embodiment of the disclosure. FIG. 1 only illustrates a portion of the source driving circuit 100. The designation 10 denotes a liquid crystal display (LCD) such as a thin film transistor (TFT) LCD.

As indicated in FIG. 1, the source driving circuit 100 includes: an exchange circuit 110, a buffer 115, digital-to-analog converters (DAC) 150A and 150B, an exchange circuit 160, buffers 170A and 170B. The buffer 115 includes a first input stage (also referred as a gain stage) 120A, a second input stage 120B, an exchange circuit 130, a first output stage 140A and a second output stage 1408. The buffers 170A and 1708 can be regarded as channel buffers. The buffers 115, 170A and 170B can be realized by operation amplifiers.

The exchange circuits 110, 130 and 160 have two operating modes, namely, the normal mode and the exchange mode. The exchange circuits 110, 130 and 160 are controlled by a polarity signal POL. When the polarity signal POL is in a first logic state (such as logic high), the exchange circuits 110, 130 and 160 are in the normal mode. When the polarity signal POL is in a second logic state (such as logic low), the exchange circuits 110, 130 and 160 are in the exchange mode.

The exchange circuit 110 receives the input signals PIN and NIN as well as the output signals POUT and NOUT fed back from the output stages 140A and 140B. The signals outputted from the exchange circuit 110 are respectively inputted to the first input stage 120A and the second input stage 120B.

The first input stage 120A receives the signal outputted from the exchange circuit 110, and further outputs to the exchange circuit 130. The second input stage 120B receives the signal outputted from the exchange circuit 110, and further outputs to the exchange circuit 130.

The exchange circuit 130 receives the signal outputted from the first input stage 120A and the signal outputted from the second input stage 120B. The signal outputted from the exchange circuit 130 is inputted to the first output stage 140A and the second output stage 1408 respectively.

The first output stage 140A receives the signal outputted from the exchange circuit 130. The output signal POUT outputted from the first output stage 140A is inputted to DAC 150A and fed back to the exchanger 110. The second output stage 140B receives the signal outputted from the exchange circuit 130. The output signal NOUT outputted from the second output stage 140B is inputted to the DAC 150B, and fed back to the exchanger 110.

The DAC 150A receives the output signal POUT outputted from the first output stage 140A and outputs to the exchanger 160. The DAC 150B receives the output signal NOUT outputted from the second output stage 140B and outputs to the exchanger 160.

The exchange circuit 160 receives the signal outputted from the DAC 150A and the signal outputted from the DAC 150B. The signal outputted from the exchange circuit 160 is inputted to the buffers 170A and 170B respectively.

The buffer 170A receives the signal outputted from the exchange circuit 160 and outputs an analog driving voltage PVG. Likewise, the buffer 170B receives the signal outputted from the exchange circuit 160 and outputs an analog driving voltage NVG. The polarity of the analog driving voltages PVG is different that of the analog driving voltage NVG.

Figure 2:
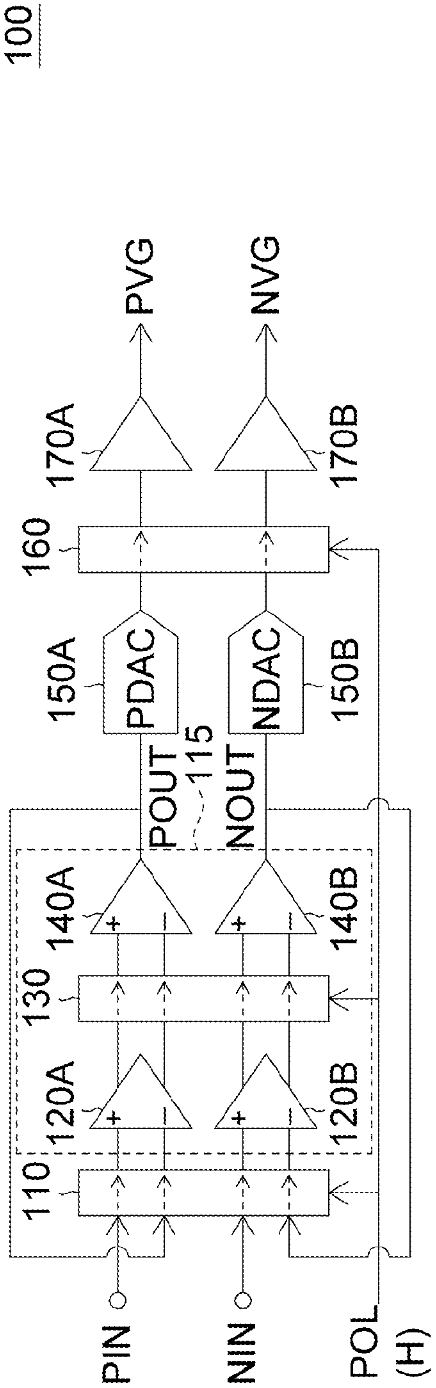
FIGS. 2-3 show operations of the source driving circuit according to the embodiment of the disclosure.
Figure 3:
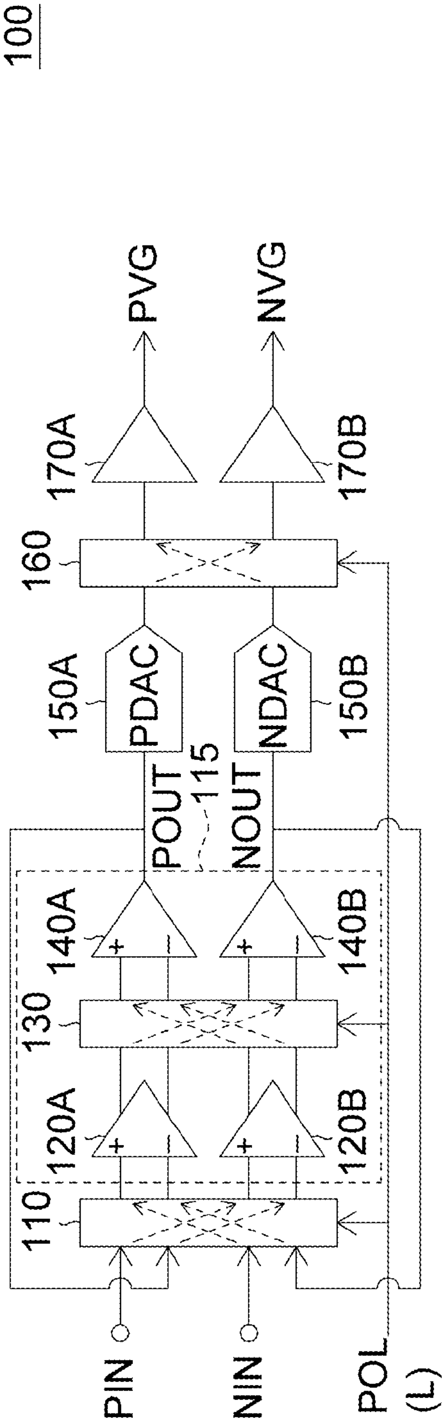
Figure 4:
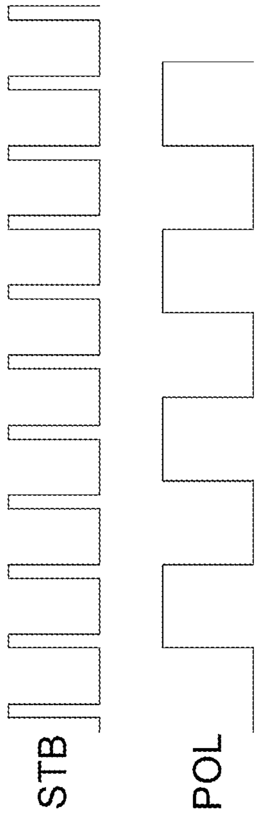
FIG. 4 shows a signal timing diagram according to the embodiment of the disclosure.

Operations of the embodiment of the disclosure are disclosed below. Referring to FIGS. 2~4. FIG. 2 and FIG. 3 show operations of the source driving circuit 100 according to the embodiment of the disclosure. FIG. 4 shows a signal timing diagram according to the embodiment of the disclosure, wherein the signal STB controls the timing for signal output. At falling edges of the signal STB, signals will be outputted to the display. In the present embodiment of the disclosure, the polarity signal POL is sampled at rising edges of the signal STB.

As indicated in FIG. 2, when the polarity signal POL is in the first logic state (such as logic high), the exchange circuits 110, 130 and 160 are in the normal mode. Thus, the first input stage 120A receives the input signal PIN and the output signal POUT outputted from the first output stage 140A; and the second input stage 120B receives the input signal NIN and the output signal NOUT outputted from the second output stage 140B. The first input stage 120A is connected to the first output stage 140A; and the second input stage 120B is connected to the second output stage 140B. In greater details, the signal outputted from the first input stage 120A is inputted to the first output stage 140A through the exchanger 130; and the signal outputted from the second input stage 120B is inputted to the second output stage 140B through the exchanger 130. The DAC 150A is connected to the buffer 170A; and the DAC 150B is connected to the buffer 170B. In greater details, the signal outputted from the DAC 150A is inputted to the buffer 170A through the exchanger 160; and the signal outputted from the DAC 150B is inputted to the buffer 170B through the exchanger 160.

As indicated in FIG. 3, when the polarity signal POL is in the second logic state (such as logic low), the exchange circuits 110, 130 and 160 are in the exchange mode. Thus, the second input stage 120B receives the input signal PIN and the output signal POUT outputted from the first output stage 140A; and the first input stage 120A receives the input signal NIN and the output signal NOUT outputted from the second output stage 140B. The first input stage 120A is connected to the second output stage 140B; and the second input stage 120B is connected to the first output stage 140A. In greater details, the signal outputted from the first input stage 120A is inputted to the second output stage 140B through the exchanger 130; and the signal outputted from the second input stage 120B is inputted to the first output stage 140A through the exchanger 130. The DAC 150A is connected to the buffer 170B; and the DAC 150B is connected to the buffer 170A. In greater details, the signal outputted from the DAC 150A is inputted to the buffer 170B through the exchanger 160; and the signal outputted from the DAC 150B is inputted to the buffer 170A through the exchanger 160.

When the polarity signal POL is in the first logic state (such as logic high), the output signals POUT and NOUT are respectively expressed as:

$$POUT(H)=PIN-\Delta VA \quad (1);$$

$$NOUT(H)=NIN+\Delta VB \quad (2)$$

POUT (H) and NOUT (H) respectively denote the output signals POUT and NOUT when the polarity signal POL is logic high. ΔVA and ΔVB respectively denote the offset voltages of the first input stage 120A and the second input stage 120B. In general, the system offset voltage is mainly caused by the gain stage. Different buffers have respective offset voltages because the threshold voltage of different buffers may not match with each other.

When the polarity signal POL is in the second logic state (such as logic low), the output signals POUT and NOUT are respectively expressed as:

$$POUT(L)=PIN+\Delta VB \quad (3);$$

$$NOUT(L)=NIN+\Delta VA \quad (4)$$

POUT (L) and NOUT (L) respectively denote the output signals POUT and NOUT when the polarity signal POL is logic low.

The root mean square (RMS) of the system offset voltage is expressed as:

$$RMS=POUT(H)-NOUT(L)=PIN-NIN \quad (5)$$

Formula (5) shows that in the present embodiment of the disclosure, the RMS of the system offset voltage will not be affected by the offset voltages of the input stages 120A and 120B.

The above embodiments of the disclosure have many advantages exemplified below. (1) Signal exchange can be controlled by the current-existing polarity signal POL, so the control is simplified. (2) In canceling of the system offset voltage, frequency in the signal exchange is identical to the frequency of the polarity signal POL, so the frequency is higher and the flickering problem is reduced because human eyes are not sensitive to high-frequency. (3) During the inversion of polarity, even if the threshold voltages of the buffers do not match with each other, the problem of the mismatch between the analog driving voltages PVG and NVG still can be reduced or eliminated so as to reduce or eliminate the occurrence of abnormal display.

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A driving circuit applied in an electronic display apparatus, the driving circuit comprising:

a first exchange circuit; and a first buffer coupled to the first exchange circuit, comprising:

a first input stage and a second input stage both coupled to the first exchange circuit;

a second exchange circuit coupled to the first input stage and the second input stage; and a first output stage and a second output stage both coupled to the second exchange circuit;

circuitry to selectively operate the electronic display apparatus in a first operating mode and a second operating mode, whereby in the first operating mode the circuitry is configured to perform the following operations:

amplifying a first input signal and a first output signal by a first input stage;

amplifying a second input signal and a second output signal by a second input stage;

amplifying an output signal outputted from the first input stage by a first output stage to obtain the first output signal, the first output signal further fed back to the first input stage;

amplifying an output signal outputted from the second input stage by a second output stage to obtain the second output signal, the second output signal further fed back to the second input stage;

performing digital-to-analog conversion on an output signal outputted from the first output stage to obtain a first intermediate analog signal;

performing digital-to-analog conversion on an output signal outputted from the second output stage to obtain a second intermediate analog signal;

amplifying the first intermediate analog signal by a first buffer to obtain a first analog output signal; and amplifying the second intermediate analog signal by a second buffer to obtain a second analog output signal;

and in the second operating mode the circuitry is configured to perform the following operations:

amplifying the first input signal and the first output signal by the second input stage;

amplifying the second input signal and the second output signal by the first input stage;

amplifying the output signal outputted from the first input stage by the second output stage to obtain the second output signal, the second output signal further fed back to the first input stage;

amplifying the output signal outputted from the second input stage by the first output stage to obtain the first output signal, the first output signal further fed back to the second input stage;

performing digital-to-analog conversion on the signal outputted from the first output stage to obtain the first intermediate analog signal;

performing digital-to-analog conversion on the output signal outputted from the second output stage to obtain the second intermediate analog signal;

amplifying the second intermediate analog signal by the first buffer to obtain the first analog output signal; and amplifying the first intermediate analog signal by the second buffer to obtain the second analog output signal; and driving the electronic display apparatus by the first analog output signal and the second analog output signal.

2. The driving circuit according to claim 1, further comprising:

a first conversion circuit coupled to the first output stage;

a second conversion circuit coupled to the second output stage;

a third exchange circuit coupled to the first conversion circuit and the second conversion circuit;

a second buffer coupled to the third exchange circuit; and a third buffer coupled to the third exchange circuit.

3. The driving circuit according to claim 2, wherein, in a first operating mode:

the first exchange circuit couples the first input signal and the first output signal outputted from the first output stage to the first input stage;

the first exchange circuit couples the second input signal and the second output signal outputted from the second output stage to the second input stage;

the second exchange circuit couples the first input stage to the first output stage;

the second exchange circuit couples the second input stage to the second output stage;

the third exchange circuit couples the first conversion circuit to the second buffer; and the third exchange circuit couples the second conversion circuit to the third buffer.

4. The driving circuit according to claim 2, wherein, in a second operating mode:

the first exchange circuit couples the first input signal and the first output signal outputted from the first output stage to the second input stage;

the first exchange circuit couples the second input signal and the second output signal outputted from the second output stage to the first input stage;

the second exchange circuit couples the first input stage to the second output stage;

the second exchange circuit couples the second input stage to the first output stage;

the third exchange circuit couples the first conversion circuit to the third buffer; and the third exchange circuit couples the second conversion circuit to the second buffer.

5. An electronic display apparatus, comprising:

a driving circuit, comprising:

a first exchange circuit; and a first buffer, comprising:

a first input stage coupled to the first exchange circuit;

a second input stage coupled to the first exchange circuit;

a second exchange circuit coupled to the first input stage and the second input stage;

a first output stage coupled to the second exchange circuit; and a second output stage coupled to the second exchange circuit; circuitry to selectively operate the electronic display apparatus in a first operating mode and a second operating mode, whereby in the first operating mode the circuitry is configured to perform the following operations:

amplifying a first input signal and a first output signal by a first input stage;

amplifying a second input signal and a second output signal by a second input stage;

amplifying an output signal outputted from the first input stage by a first output stage to obtain the first output signal, the first output signal further fed back to the first input stage;

amplifying an output signal outputted from the second input stage by a second output stage to obtain the second output signal, the second output signal further fed back to the second input stage;

performing digital-to-analog conversion on an output signal outputted from the first output stage to obtain a first intermediate analog signal;

performing digital-to-analog conversion on an output signal outputted from the second output stage to obtain a second intermediate analog signal;

amplifying the first intermediate analog signal by a first buffer to obtain a first analog output signal; and amplifying the second intermediate analog signal by a second buffer to obtain a second analog output signal;

and in the second operating mode the circuitry is configured to perform the following operations:

amplifying the first input signal and the first output signal by the second input stage;

amplifying the second input signal and the second output signal by the first input stage;

amplifying the output signal outputted from the first input stage by the second output stage to obtain the second output signal, the second output signal further fed back to the first input stage;

amplifying the output signal outputted from the second input stage by the first output stage to obtain the first output signal, the first output signal further fed back to the second input stage;

performing digital-to-analog conversion on the signal outputted from the first output stage to obtain the first intermediate analog signal;

performing digital-to-analog conversion on the output signal outputted from the second output stage to obtain the second intermediate analog signal;

amplifying the second intermediate analog signal by the first buffer to obtain the first analog output signal; and amplifying the first intermediate analog signal by the second buffer to obtain the second analog output signal; and driving the electronic display apparatus by the first analog output signal and the second analog output signal.

6. The electronic display apparatus according to claim 5, wherein the driving circuit further comprises:

a first conversion circuit coupled to the first output stage;

a second conversion circuit coupled to the second output stage;

a third exchange circuit coupled to the first conversion circuit and the second conversion circuit;

a second buffer coupled to the third exchange circuit; and a third buffer coupled to the third exchange circuit.

7. The electronic display apparatus according to claim 6, wherein, in a first operating mode:

the first exchange circuit couples the first input signal and the first output signal outputted from the first output stage to the first input stage;

the first exchange circuit couples the second input signal and the second output signal outputted from the second output stage to the second input stage;

the second exchange circuit couples the first input stage to the first output stage;

the second exchange circuit couples the second input stage to the second output stage;

the third exchange circuit couples the first conversion circuit to the second buffer; and the third exchange circuit couples the second conversion circuit to the third buffer.

8. The electronic display apparatus according to claim 6, wherein, in a second operating mode:

the first exchange circuit couples the first input signal and the first output signal outputted from the first output stage to the second input stage;

the first exchange circuit couples the second input signal and the second output signal outputted from the second output stage to the first input stage;

the second exchange circuit couples the first input stage to the second output stage;

the second exchange circuit couples the second input stage to the first output stage;

the third exchange circuit couples the first conversion circuit to the third buffer; and the third exchange circuit couples the second conversion circuit to the second buffer.

9. A driving method for an electronic display apparatus, comprising:

in a first operating mode:

amplifying a first input signal and a first output signal by a first input stage;

amplifying a second input signal and a second output signal by a second input stage;

amplifying an output signal outputted from the first input stage by a first output stage to obtain the first output signal, the first output signal further fed back to the first input stage;

amplifying an output signal outputted from the second input stage by a second output stage to obtain the second output signal, the second output signal further fed back to the second input stage;

performing digital-to-analog conversion on an output signal outputted from the first output stage to obtain a first intermediate analog signal;

performing digital-to-analog conversion on an output signal outputted from the second output stage to obtain a second intermediate analog signal;

amplifying the first intermediate analog signal by a first buffer to obtain a first analog output signal; and amplifying the second intermediate analog signal by a second buffer to obtain a second analog output signal;

in a second operating mode:

amplifying the first input signal and the first output signal by the second input stage;

amplifying the second input signal and the second output signal by the first input stage;

amplifying the output signal outputted from the first input stage by the second output stage to obtain the second output signal, the second output signal further fed back to the first input stage;

amplifying the output signal outputted from the second input stage by the first output stage to obtain the first output signal, the first output signal further fed back to the second input stage;

performing digital-to-analog conversion on the signal outputted from the first output stage to obtain the first intermediate analog signal;

performing digital-to-analog conversion on the output signal outputted from the second output stage to obtain the second intermediate analog signal;

amplifying the second intermediate analog signal by the first buffer to obtain the first analog output signal; and amplifying the first intermediate analog signal by the second buffer to obtain the second analog output signal; and driving the electronic display apparatus by the first analog output signal and the second analog output signal.

* * * * *